(12) United States Patent
Nasich

(10) Patent No.: US 10,676,275 B2
(45) Date of Patent: Jun. 9, 2020

(54) SELF-UNLOADING CONTAINER FOR THE TRANSPORT OF CEREALS AND OILSEEDS

(71) Applicant: Sergio Roman Nasich, Pcia. de Santa Fe (AR)

(72) Inventor: Sergio Roman Nasich, Pcia. de Santa Fe (AR)

( * ) Notice: Subject to any disclaimer, the term of this patent is extended or adjusted under 35 U.S.C. 154(b) by 0 days.

(21) Appl. No.: 16/273,857

(22) Filed: Feb. 12, 2019

(65) Prior Publication Data

US 2019/0308805 A1 Oct. 10, 2019

(30) Foreign Application Priority Data

Apr. 4, 2018 (AR) .............................. P20180101016

(51) Int. Cl.
*B65G 65/23* (2006.01)
*B65D 88/54* (2006.01)
*B65D 88/56* (2006.01)

(52) U.S. Cl.
CPC ......... *B65D 88/542* (2013.01); *B65D 88/546* (2013.01); *B65D 88/56* (2013.01); *B65G 65/23* (2013.01)

(58) Field of Classification Search
CPC .... B65D 88/542; B65D 88/546; B65D 88/56; B65G 65/23
See application file for complete search history.

(56) References Cited

U.S. PATENT DOCUMENTS

| 6,409,274 | B1* | 6/2002 | Merrett | B60P 3/2245 220/1.6 |
| 7,118,319 | B1* | 10/2006 | Debrunner | B65G 65/23 414/414 |
| 2015/0023769 | A1* | 1/2015 | Oberg | B65G 65/23 414/299 |
| 2018/0086245 | A1* | 3/2018 | Heck | B60P 1/286 |

* cited by examiner

*Primary Examiner* — Saul Rodriguez
*Assistant Examiner* — Ashley K Romano
(74) *Attorney, Agent, or Firm* — Fay Sharpe LLP; James E. Scarbrough

(57) ABSTRACT

A container to be used with trucks, semitrailers, railway wagons and ships, so as to carry out a multimodal transport where the transport by land, railway and fluvial routes is combined as needed. The container has a metal parallelepiped structure which contains a truck bed receiving the material, and one end it is mounted over a hinging resource that allows its turn regarding a lower cross axis; and at another end it is connected with a hydraulic cylinder that is fixed over the basis of the mentioned metallic structure and has its end free of its piston linked to the upper and rear cross edge of the truck bed.

4 Claims, 6 Drawing Sheets

SELF-UNLOADING CONTAINER FOR THE TRANSPORT OF CEREALS AND OILSEEDS

FIELD OF THE DISCLOSURE

The present disclosure has as its main purpose a self-unloading container for the transport of cereals and oilseeds, whereby the current problem of the transport of cereals has been considerably improved, since it can be applied both over trucks and railway wagons and ships, so that it is possible to combine the transport in land, railway and fluvial routes according to the need and possibility, reducing transport and transfer costs considerably, one of the mail problems of the country at present.

More specifically, the present disclosure refers to a novel container that belongs to the type that at the same time it transports cereal and it also has resources for its automatic unloading.

In the first place, it should be highlighted that the self-unloading container of this disclosure differs from others of its type since it efficiently solves the problem of the selection of land transport, that can be train or routes or freeways, since it is suitable to be placed over a truck and transferred to a railway wagon easily and directly.

To this effect, the container of the present disclosure is made up of a metal parallelepiped strong structure, with dimensions and shape equivalent to the ones of a conventional maritime container, with the difference that said structure hosts and contains a receiver truck bed or hopper of the material, differentiated because in accordance in one end it is mounted over a hinging resource that allows its turn regarding a lower cross axis; while over the other end it is associated to an hydraulic cylinder that is fixed over the basis of the mentioned metallic structure and has its end free of its piston linked to the upper and rear cross edge of said truck bed, through which it is possible to overturn it to cause the unloading of the transported material.

Accordingly, a container suitable to receive the load while it is arranged over a truck that entered into the farming establishment is created, which can be used to transport the material until a nearby railway station, and there be transported to be arranged over the railway wagon to continue its travel until destination, or even to a port, reducing transport cost significantly.

It refers to a disclosure that defines a new combination of means designed to achieve an improved outcome, being it unpredictable and surprising even for an expert if the field. Consequently, apart from being new, its constructive and functional design shows a clear inventive activity, so that it complies with the requirements of being considered a patentable invention.

BACKGROUND OF THE DISCLOSURE

As it is well known, the cereals and oilseed transport, both in our country and worldwide, requires a great amount of vehicles circulating either by routes, freeways, rural roads, railways, ships, etc., to transport them from production plants to the storage and processing companies.

Depending on the distances and geographic location of each of the production, storage and process centers, the cereals and oilseed transport can be made in many ways, namely:

Land Routes (trucks): this is the most versatile transport since it allows using roads, freeways and rural roads, either for long distances or short distance journeys.

It is worth mentioning that in the land route transport, the load can be transported through the so-called cereal tipper trucks, distinguished because they have a fixed container with parallelepiped shape, receiver of the bulk material, which is filled to capacity.

It should be pointed out that, for the unloading of this type of trucks it is necessary to use nozzles in the lower part of the trucks (traditional and slow manner) or even the use of tipper machines that elevate and tilt all the vehicle (truck, chassis and trailer), allowing the cereal fall through the rear part, thereby achieving a faster unloading proceeding.

The so-called convey or truck beds are also known, that define a great, also parallelepiped, container planned to be arranged over the chassis of a truck or semitrailer that transports it.

Generally, at the moment of the unloading, this same truck bed, through a hydraulic cylinder, is elevated and tilted, allowing the unloading from the rear part, not being necessary to use the tipper machine that elevates all the truck as a whole.

As is known, the use of the railway (trains) is one of the cheapest forms of transport and also has less of an impact on traffic within a country. The major disadvantage it has is that it has defined routes due to the need of the railway traces.

The maritime transport (ships) is also known, that as well as the trains, is less expensive than the use of trucks, and does not impact on the traffic of the land routes. Another great advantage is that it allows reaching other continents. Despite of this it needs the natural or artificial channels to move and join the destination points.

The reason for using one or another transport system, lies mainly in the costs of mobility, as well as depending on the geographical position of the origin and destination places of the products.

Apart from the mentioned means of transport, the transfer of the load in the destination place should also be considered. This is due to the fact that cereals or oilseeds are transported in bulk, and it is necessary to have facilities according to the material to be able to make the unloading and transfer to another vehicle, or to the storage and processing plants.

Another important aspect to be considered are the great economic and human lives costs, due to the accidents caused by each of the mentioned transports, being most of them caused by trucks, then trains and to a lesser degree by the maritime transport. At the same time, they interfere with the traffic of the routes used by the civil population for its own transportation.

Thus, there is a need for a new and improved self-unloading container for the transport of cereals and oilseeds which overcomes the above mentioned deficiencies and others while providing better overall results.

SUMMARY OF THE DISCLOSURE

The self-unloading container for the transport of cereals and oilseeds referred to in this disclosure effectively solves the problem mentioned more efficiently than all the methods and resources known until now.

The main advantage can be appreciated in the fact that with the presence of this type of container, it is more easy and versatile to choose of the form of transport of the cereals and oilseeds, since it allows the transport on a truck, semitrailer, train and eventually ships.

In particular the fact that that a same unit can be transported on a truck or semitrailer through land routes and then be easily removed from the truck with the load, to afterwards mount the unit on the wagon of a train, has to be highlighted, which has not been possible with any resource of cereal transport of the ones known until now.

It also stands that using the container of this disclosure no additional machines are necessary for the unloading. A hydraulic pump may be necessary, that are generally included in the trucks and/or tractors and can also be external.

To this effect, the container referred to in the present disclosure, responding to the same constructive and operative principle above-mentioned for the "Conveyor Truck beds", stands out because it is mounted within a parallelepiped metallic solid structure and of equal dimensions to the ones of a standard maritime container, that can be installed and fixed over trucks, semitrailers and railway wagons, apart from stowage in the destination places.

This way, it is possible to make the load over a truck in the production facility, produce its transport until a railway, there transfer it arranging it over a railway wagon and continue the travel this way to the destination, or even to another collection center. That is, it allows a versatility of the transport that directly influences over costs.

Special emphasis should be placed in the fact that for the transport of the container from one truck to a railway wagon or vice versa, a conventional machine like the ones used for maritime containers can be used, which are generally located in ports and land logistics and distribution centers both for trucks and trains. Conventional cranes can also be used, with the only condition that they support weight.

Generally, the ones that render this type of services also have the machines to handle auto-dumping containers, similar to the ones used in the port, or even a boom. This way the cereal contained in these recipients, can be stored by stacking them or be transported in a truck/train combination according to the logistics.

In preferred embodiments, the truck beds can be charged in the field at the harvest time, or in the grain collection places, such as regional cooperatives; it is then transported to the port that is its final destination where after the necessary controls, the load is dumped up to 30 to quickly, approximately 2 minutes, versus a rail conventional hopper car that can delay 10-12 minutes.

Furthermore, if two self-unloading containers are placed face to face in two consecutive railway wagons or even to a bitren truck (a truck hauling two semitrailers), 60 tons can be unloaded at the same time.

It should be noted that due to the load capacity of the invented container, even if it is optimal for cereals and oilseeds, it is also possible to transport any type of goods.

Still other aspects of the present disclosure will become apparent upon a reading and understanding of the following detailed description.

Inventive Activity

No container for the transport of cereals and oilseeds known up to now offers, not even suggests, the constructive and operative solution that arises from what has been mentioned in the prior paragraphs, reason why it is an offer that, apart from being novel, has a clear inventive activity.

BRIEF DESCRIPTION OF THE FIGURES

In order to realize the advantages herein superficially referred to, to which users and experts in the field can add many others, and in order to ease the understanding of the constructive, constituent and operative characteristics of the invented Mechanical Equipment, a preferred embodiment is described below that is illustrated schematically and without a determined scale, in the attached sheets, with the express clarification that, precisely, as it is an example, it does not correspond to assign it a limitative or exclusive character of the scope of protection of the present disclosure/utility model, but it simply has a merely explicative and illustrative purpose of the basic concept it is based on.

It is hereby clarified that in all the figures, equal reference numbers and letters correspond to the same or equivalent constituent elements or parts of the whole, according to the chosen example for the present explanation of the invented container.

DETAILED DESCRIPTION OF THE DISCLOSURE

Figure 1:
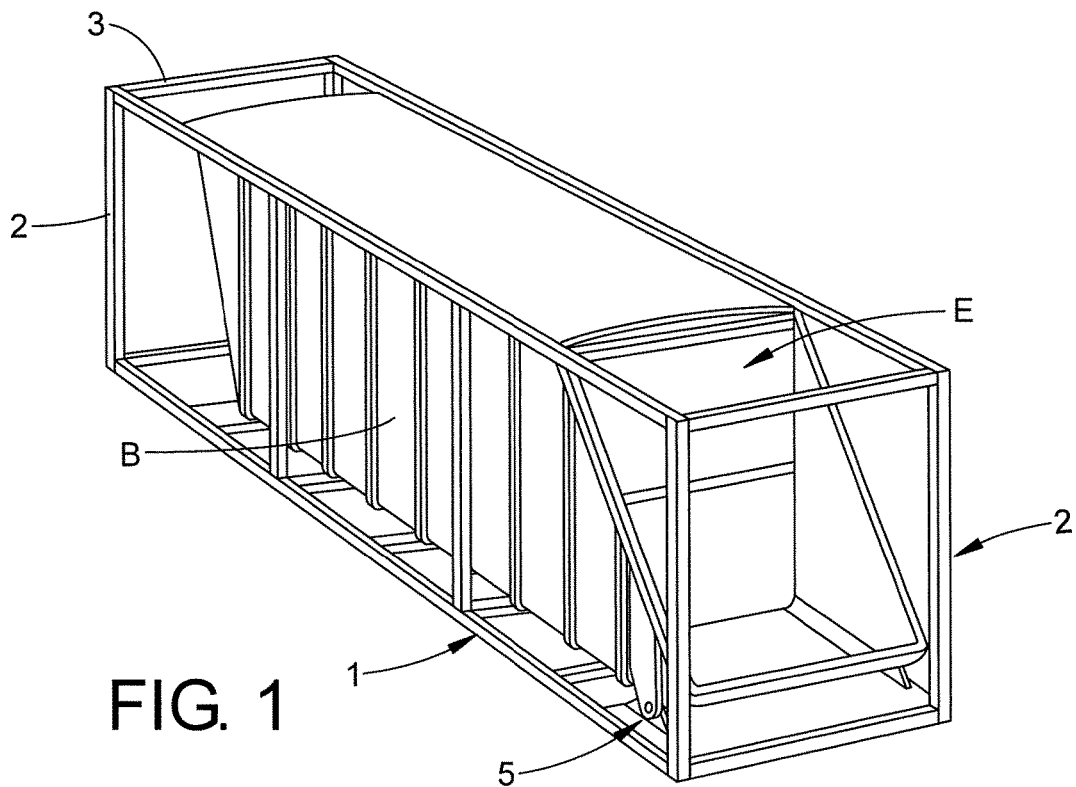
FIG. 1 is a perspective view that shows the container of a preferred embodiment of the present disclosure.

As can be seen in FIG. 1, the container referred to in the present disclosure basically includes a main support external metallic structure (E), made up of side rails (1), studs (2) and cross bars (3), forming a parallelepiped body that meets the dimensions of a conventional maritime container.

It can be seen that this structure (E) includes and hosts a truck bed (B) that forms the container that receives the material to be transported, that can be cereals, oilseeds and the like.

Figure 2:
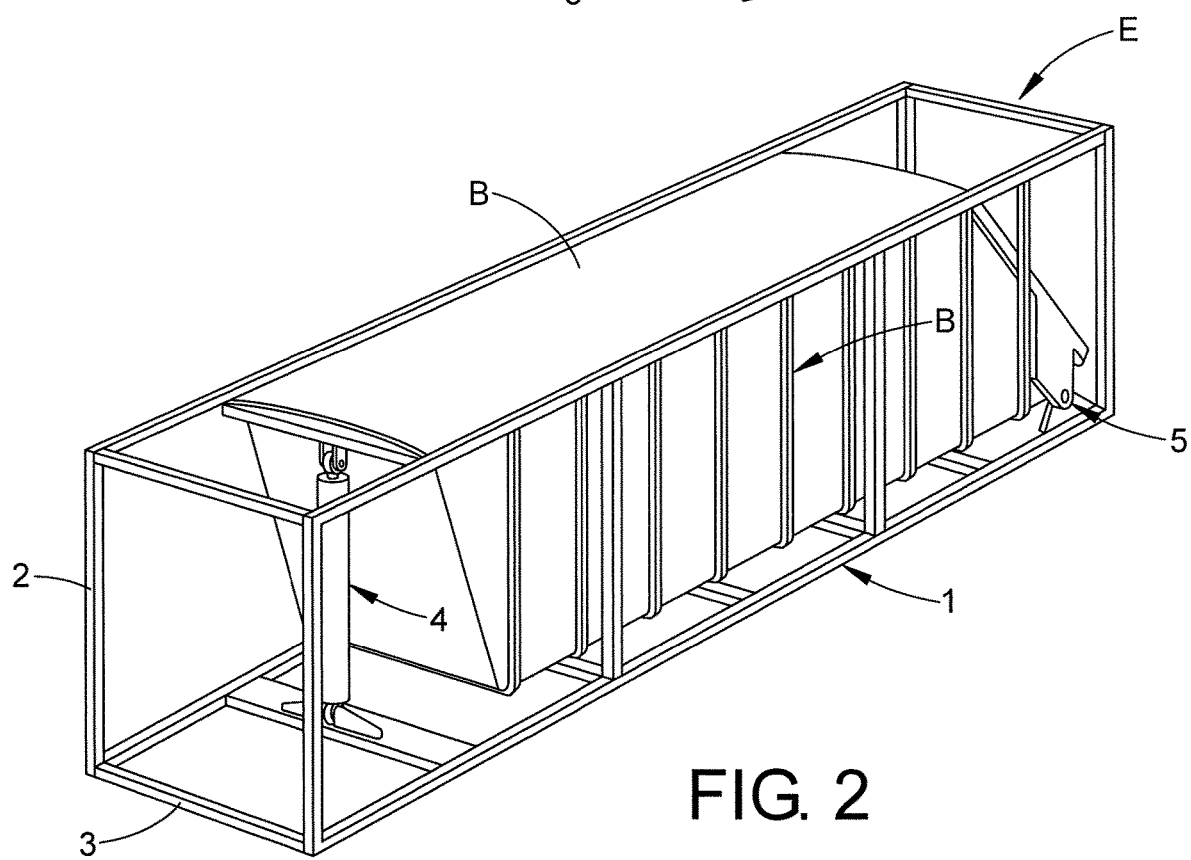
FIG. 2 is also a perspective view of the same container of FIG. 1 observed from an opposite side view to the one of FIG. 1.

Referring to FIG. 2, the container can be seen from another angle, allowing viewing the position of a hydraulic cylinder (4) in its rest position that has been planned to dump the truck bed (B) to the unloading position.

Figure 3:
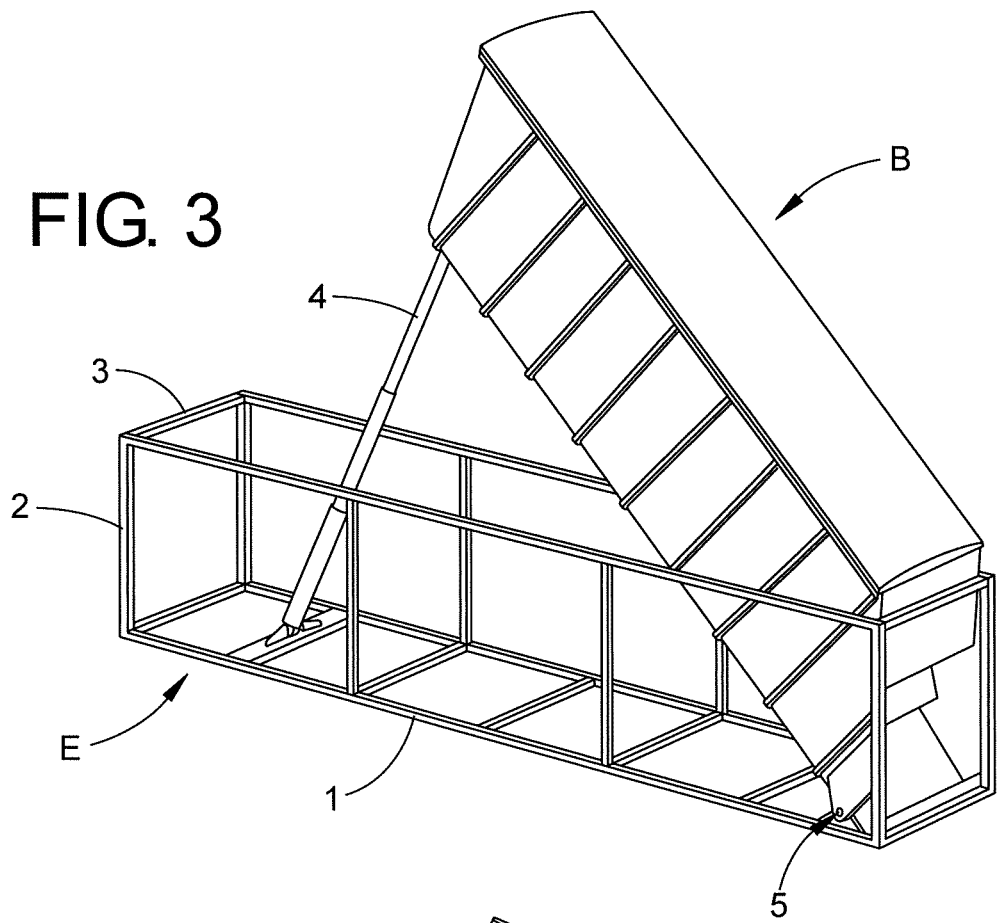
FIG. 3 is a perspective view that shows the container with a truck bed in an unloading position.

Furthermore, FIG. 3 shows that with the actuation of the aforementioned hydraulic cylinder (4) the truck bed (B) elevation is reached carrying out an unloading operation.

It can be seen that, while preserving the external structure (E) stable, the elevation of the inner truck bed (B) is allowed due to the actuation of the hydraulic cylinder (4).

Figure 4:
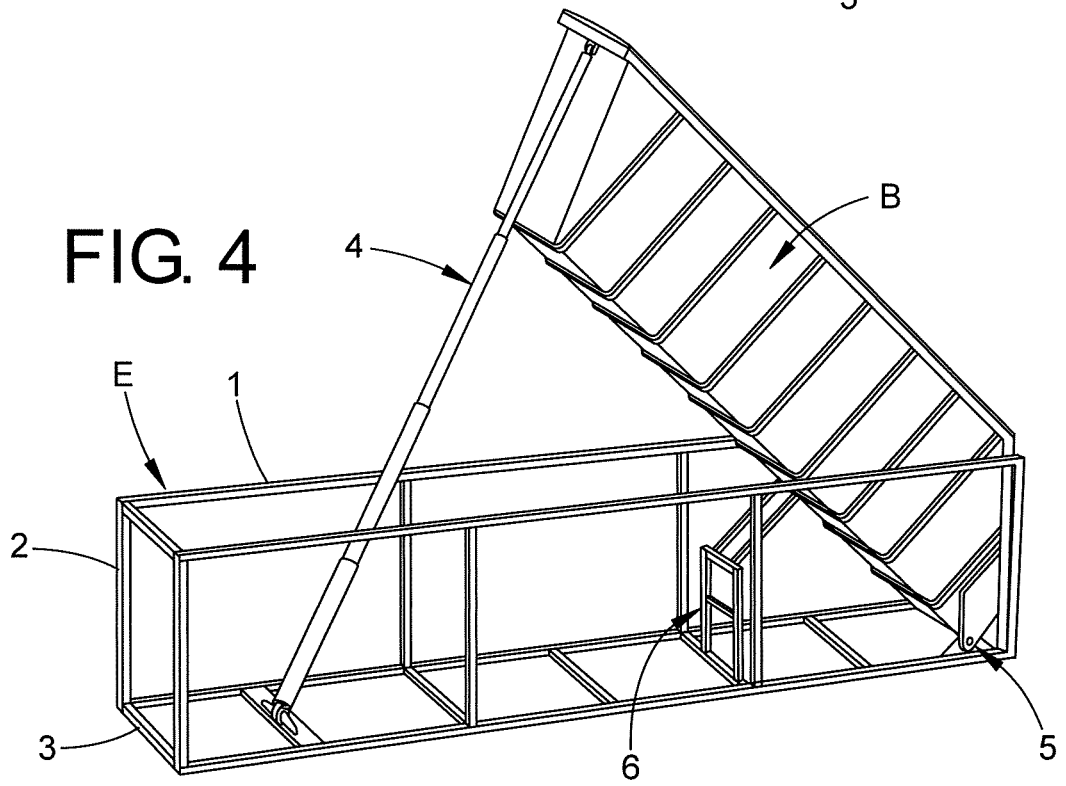
FIG. 4 is a perspective view that shows the truck bed in the unloading position, observed from a lateral face.

As can be seen especially in FIGS. 3 and 4, the mentioned inner truck bed (B) turns when pivoting over the hinges (5).

FIG. 4 highlights the presence of the stabilizer (6) planned to ensure the stability during the unloading.

In preferred embodiments the mentioned side rails (1), studs (2) and cross bars (3) that form the metallic structure (E) can be made of steel material or profiles that will support the inner truck bed (B) load and the actuation of the hydraulic cylinder (4).

It is important to highlight that the metallic structure (E) has the same dimensional characteristics as a standard maritime container, which allows versatility of the equipment, as it can be mounted on trucks, semitrailers and railway wagons suitable for this type of containers observing weights and dimensions capable of being transported through railways and land routes.

It was also highlighted that, in the preferred embodiments, the above-mentioned inner truck bed (B) has the same volumetric capacity as the conventional truck bed, observing maximum loads and its strong structure.

Furthermore, the mentioned hydraulic cylinder (4) can be of the telescopic type, as the ones used by conventional truck beds, and that the energy source (hydraulic center) used for its actuation can be found in the same equipment or be stationary in the load unloading site.

The disclosure enables that the container may come in different forms, designed to satisfy the same mentioned need, in which case the same operative results can be obtained.

Figure 5:
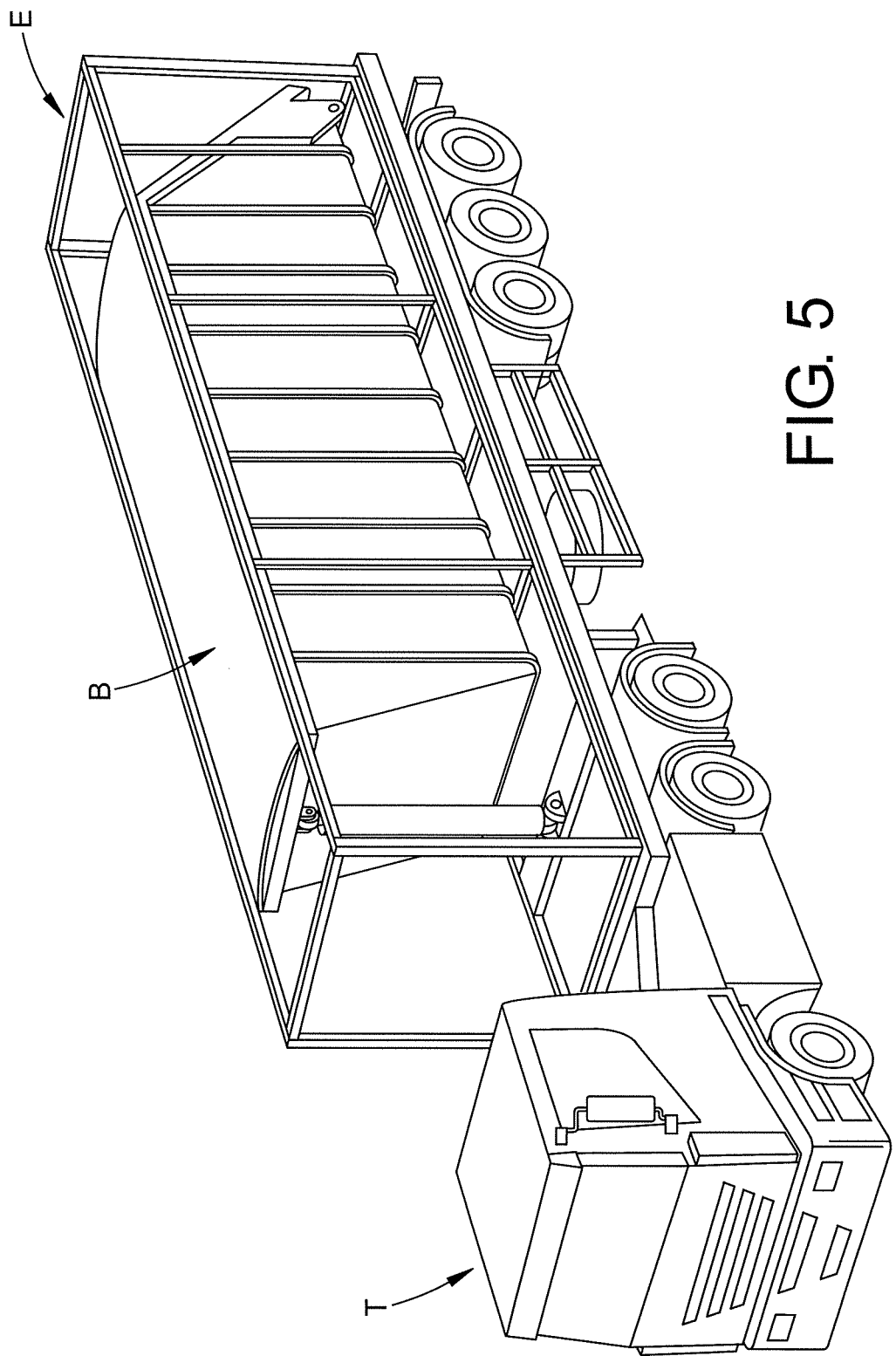
FIG. 5 is a perspective view that shows the container of the present disclosure arranged over a semitrailer truck.
Figure 6:
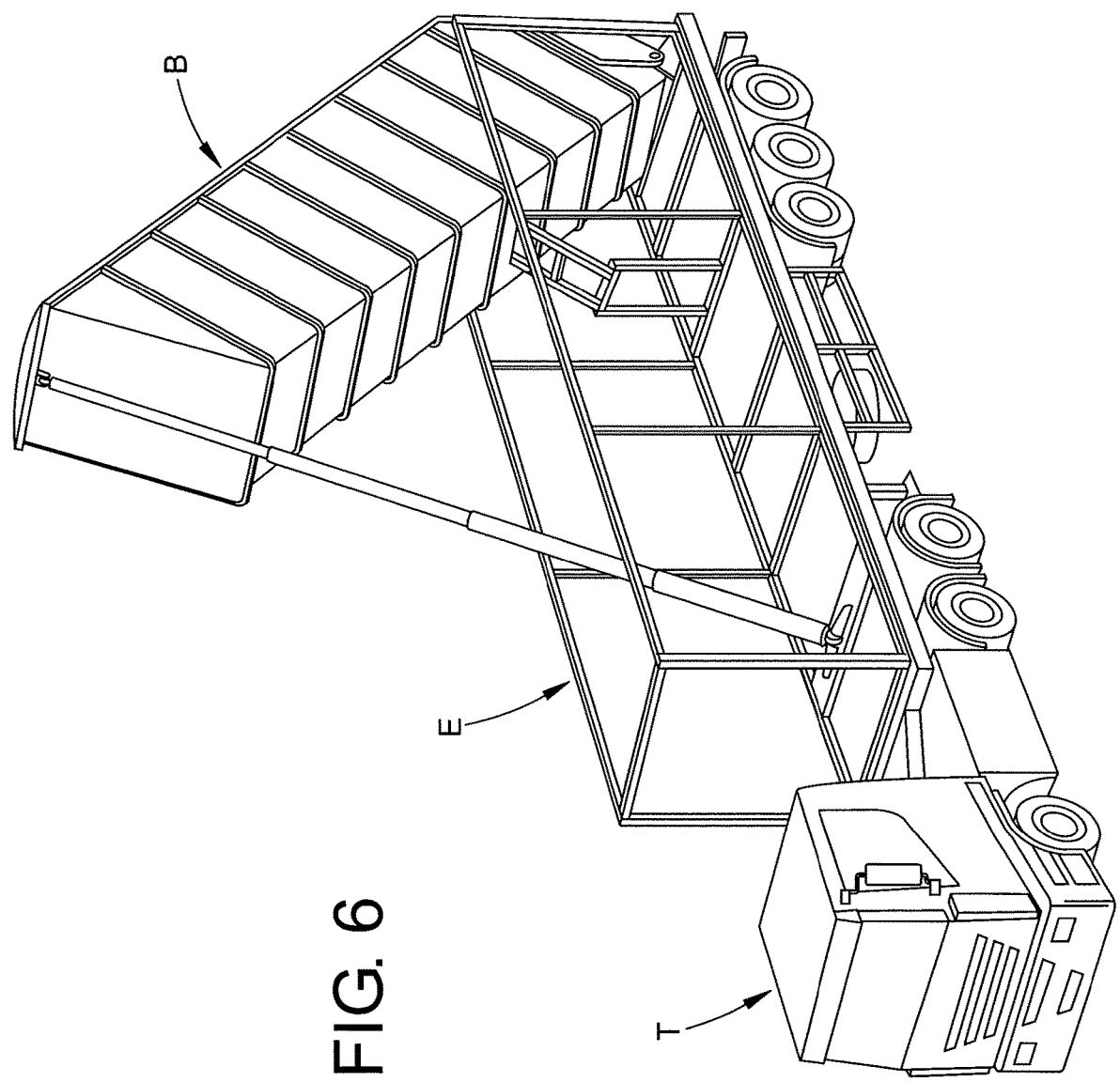
FIG. 6 is a perspective view that shows the container of the present disclosure over a semitrailer truck, with its truck bed in unloading position.

Referring now to FIGS. 5 and 6 the structure (E) and truck bed (B) invented arranged on a semitrailer (T).

Figure 7:
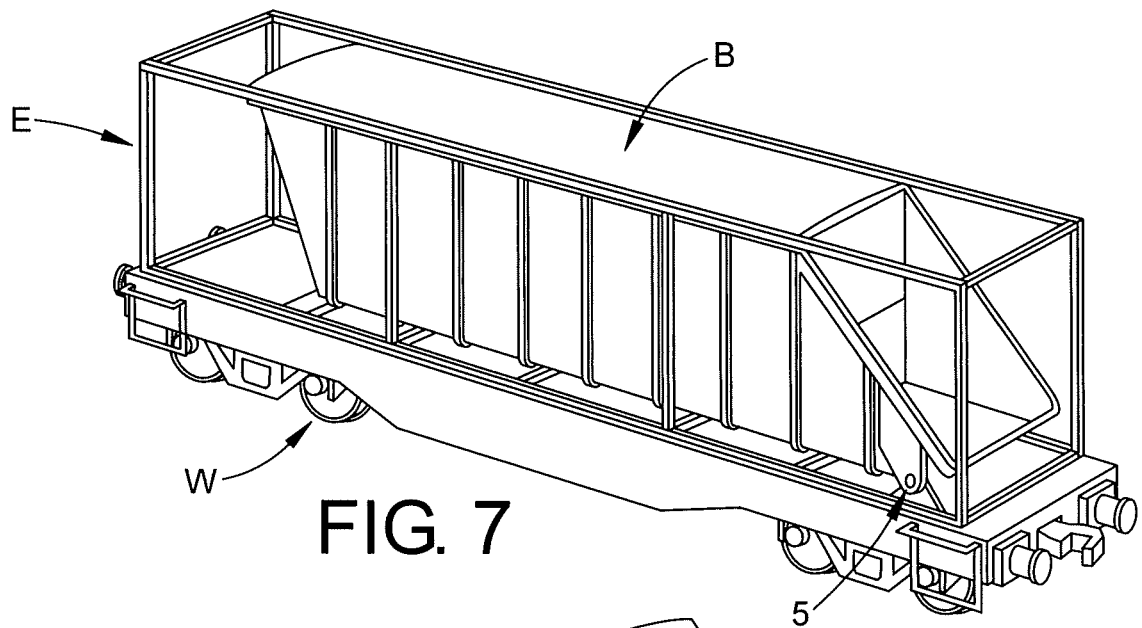
FIG. 7 is a perspective view that shows the container of the present disclosure arranged over a railway wagon.
Figure 8:
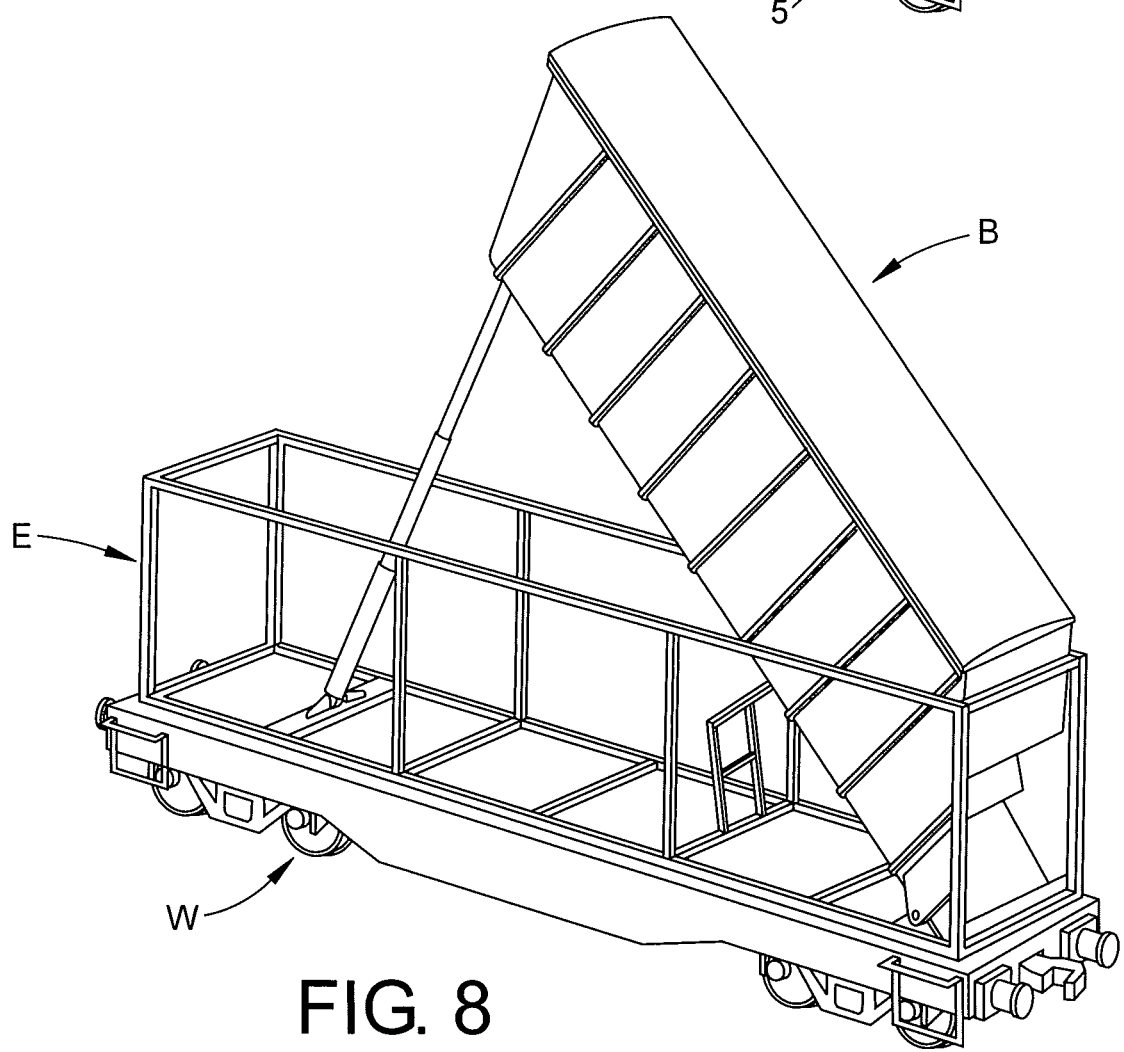
FIG. 8 is a perspective view that represents the container of the present disclosure over a railway wagon, with its truck bed in an unloading position.
Figure 9:
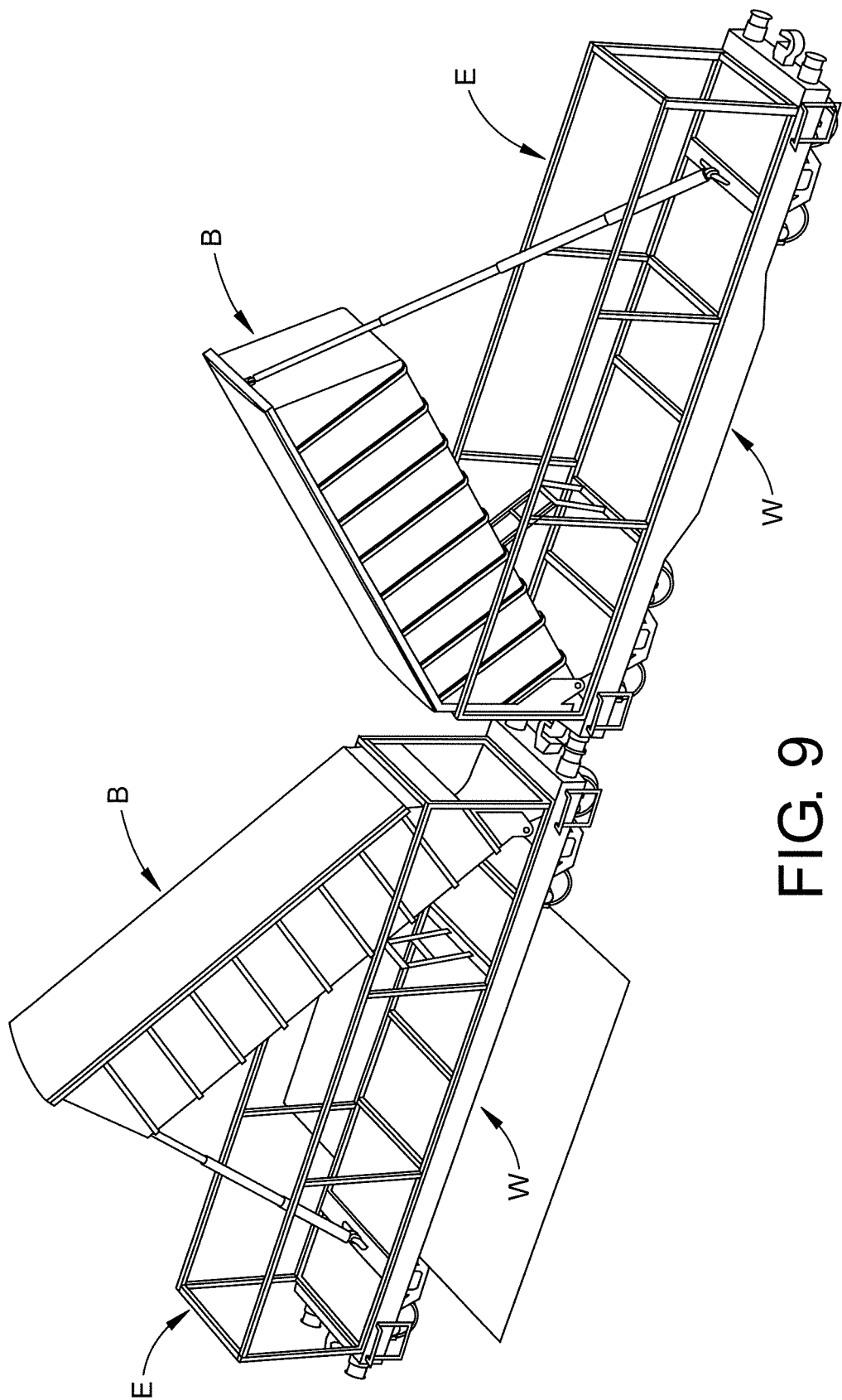
FIG. 9 is a perspective view that shows two railway wagons carrying the respective containers in an unloading position.

FIGS. 7 and 8 illustrate the same equipment (E) and (B) arranged over a railway wagon (W), whilst FIG. 9 represents the example where the use of two faced containers (E) and truck beds (B) are used, arranged in two consecutive railway wagons (W), what can also be a bitren truck (a truck hauling two semitrailers), in which case the unloading capacity per unit of time is increased.

Having described and exemplified the nature and main purpose of the present disclosure, as well as the manner in which it can be carried out, the following are hereby claimed as exclusive property and rights:

1. A self-unloading container for the transport of cereals and oilseeds, to be applied over trucks, semitrailers, railway wagons and ships, so that it is possible to carry out a multimodal transport where the transport by land, railway and fluvial routes is combined according to the needs of each case, comprising a metal parallelepiped structure, which contains a pivotable truck bed for receiving material wherein said truck bed is contained within said metal parallelepiped structure, wherein at one end it is mounted over a hinging resource that allows its turn regarding a lower cross axis; while over the other end it is associated to an hydraulic cylinder that is fixed over the basis of the metal parallelepiped structure and has a end free of a piston linked to an upper and rear cross edge of said truck bed, through which it is possible to overturn it to cause the unloading of transported material and wherein said truck bed pivots relative to said metal parallelepiped structure.

2. The self-unloading container for the transport of cereals and oilseeds, according to claim 1, wherein the parallelepiped metallic structure includes steel profiles that define corresponding side rails, studs and cross bars.

3. The self-unloading container for the transport of cereals and oilseeds, according to claim 1 wherein the hinging resource includes a pair of side hinges arranged in correspondence with lower and rear vertexes of the truck bed.

4. The self-unloading container for the transport of cereals and oilseeds, according to claim 1, wherein between a lower crossbar of the metal parallelepiped structure and an intermediate and external point of the basis of the truck bed there is a stabilizer that maintains the truck bed in an unloading position.

\* \* \* \* \*